(12) United States Patent
Wu et al.

(10) Patent No.: US 10,446,844 B2
(45) Date of Patent: Oct. 15, 2019

(54) LITHIUM-RICH MANGANESE-BASED CATHODE MATERIAL, ITS PREPARATION METHOD AND LITHIUM-ION BATTERY

(71) Applicant: SUZHOU SUNMUN TECHNOLOGY CO., LTD., Kunshan (CN)

(72) Inventors: Borong Wu, Beijing (CN); Linjing Zhang, Beijing (CN); Ning Li, Beijing (CN); Qi Liu, Beijing (CN); Feixiang Guo, Beijing (CN); Daobin Mu, Beijing (CN); Feng Wu, Beijing (CN); Chuan Wu, Beijing (CN); Shi Chen, Beijing (CN)

(73) Assignee: SUZHOU SUNMUM TECHNOLOGY CO., LTD., Kunshan, Jiangsu (CN)

( * ) Notice: Subject to any disclaimer, the term of this patent is extended or adjusted under 35 U.S.C. 154(b) by 101 days.

(21) Appl. No.: 15/529,318

(22) PCT Filed: Apr. 14, 2015

(86) PCT No.: PCT/CN2015/076507
§ 371 (c)(1),
(2) Date: May 24, 2017

(87) PCT Pub. No.: WO2016/082426
PCT Pub. Date: Jun. 2, 2016

(65) Prior Publication Data
US 2017/0263931 A1   Sep. 14, 2017

(30) Foreign Application Priority Data
Nov. 24, 2014 (CN) .......................... 2014 1 0680632

(51) Int. Cl.
*H01M 4/505* (2010.01)
*C01G 53/00* (2006.01)
(Continued)

(52) U.S. Cl.
CPC ........ *H01M 4/505* (2013.01); *C01G 45/1228* (2013.01); *C01G 45/1257* (2013.01);
(Continued)

(58) Field of Classification Search
CPC .. H01M 4/505; H01M 10/0525; H01M 4/525; H01M 2004/021; H01M 2004/028;
(Continued)

(56) References Cited

U.S. PATENT DOCUMENTS

2011/0076556 A1* 3/2011 Karthikeyan ......... H01M 4/366
429/188

FOREIGN PATENT DOCUMENTS

| CN | 101355161 A | 1/2009 |
| CN | 101372363 A | 2/2009 |

(Continued)

OTHER PUBLICATIONS

Li et al. "One-step solution-based catalytic route to fabricate novel a-MnO2 hierachical structures on a large scale" Chem. Commun., 2005, 918-920 (Year: 2005).*

(Continued)

*Primary Examiner* — Peter F Godenschwager
*Assistant Examiner* — Andrew J. Oyer
(74) *Attorney, Agent, or Firm* — Calfee, Halter & Griswold LLP

(57) ABSTRACT

The present invention discloses a method for preparing lithium-rich manganese-based cathode material. The method comprises: dispersing α-$MnO_2$ micron particles, a nickel salt and a lithium-containing compound in a solvent to obtain a mixture, then evaporating the mixture to remove the solvent, and calcining the solid product obtained from the evaporation; wherein the lithium-containing compound is a lithium salt and/or lithium hydroxide. The present invention also provides a lithium-rich manganese-based cathode mate-
(Continued)

rial prepared by the above method. The present invention also provides a lithium-ion battery of which anode material contains the foregoing lithium-rich manganese-based anode material. The lithium-rich manganese-based cathode material provided by the present invention has high rate capability and prolonged cycle stability.

13 Claims, 2 Drawing Sheets

(51) Int. Cl.
    *C01G 45/12* (2006.01)
    *H01M 4/525* (2010.01)
    *H01M 4/02* (2006.01)
    *H01M 10/0525* (2010.01)

(52) U.S. Cl.
    CPC ............ *C01G 53/50* (2013.01); *H01M 4/525* (2013.01); *H01M 10/0525* (2013.01); *C01P 2002/52* (2013.01); *C01P 2004/03* (2013.01); *C01P 2004/61* (2013.01); *C01P 2004/62* (2013.01); *C01P 2004/64* (2013.01); *C01P 2006/40* (2013.01); *H01M 2004/021* (2013.01); *H01M 2004/028* (2013.01)

(58) Field of Classification Search
    CPC ................ C01G 53/50; C01G 45/1228; C01G 45/1257; C01P 2004/64; C01P 2004/62; C01P 2006/40; C01P 2002/52; C01P 2004/03; C01P 2004/61
    See application file for complete search history.

(56) References Cited

FOREIGN PATENT DOCUMENTS

| | | | |
|---|---|---|---|
| CN | 101764223 A | | 6/2010 |
| CN | 102237516 A | | 11/2011 |
| CN | 102891308 A | | 1/2013 |
| CN | 103367739 A | | 10/2013 |
| CN | 103490057 A | | 1/2014 |
| CN | 104157844 A | * | 11/2014 |
| CN | 104157844 A | | 11/2014 |
| JP | 2003-112924 A | | 4/2003 |

OTHER PUBLICATIONS

English Translation of CN104157844 (Year: 2014).*

* cited by examiner

LITHIUM-RICH MANGANESE-BASED CATHODE MATERIAL, ITS PREPARATION METHOD AND LITHIUM-ION BATTERY

CROSS REFERENCE TO RELATED APPLICATIONS

This application is a 35 USC § 371 national stage application of PCT/CN2015/076507, which was filed Apr. 14, 2015, and claims priority to Chinese Patent Application No. 201410680632.7, filed Nov. 24, 2014, both of which are incorporated herein by reference as if fully set forth.

FIELD OF THE INVENTION

The present invention relates to a lithium-rich manganese-based cathode material, its preparation method and lithium-ion battery.

BACKGROUND OF THE INVENTION

Lithium-ion batteries as advanced secondary batteries with great potential play a very important role in portable energy storage devices, electric vehicles (EVs) and hybrid electric vehicles (HEVs) owing to their advantages, such as high energy density, high voltage and environmental benign. Usually, the key to the development of high-performance rechargeable lithium-ion batteries is cathode material. However, conventional cathode materials, such as $LiCoO_2$, $LiFePO_4$, $LiNiO_2$, $LiMnO_2$ and $LiMO_2$ (M is two or more of Ni, Mn and Co), have a low electrochemical capacity with an actual capacity lower than 200 mAh $g^{-1}$ in general, this has limited their applications in next-generation high-energy-density lithium-ion batteries. Therefore, it is still a great challenge to develop a cahode material with high energy density. Lithium-rich layered material $xLi_2MnO_3 \cdot (1-x)LiNi_{1/2}Mn_{1/2}O_2$ has attracted extensive attentions due to its high capacity (>250 mAh $g^{-1}$) and low cost, and it is a promising cathode material. The most attractive feature of such lithium-rich layered cathode material is that it can be recharged to a high voltage (>4.5V) through activation of $Li_2MnO_3$ component, thereby obtaining a high charge/discharge capacity (>250 mAh $g^{-1}$) and overcoming the defects of conventional cathode materials, which are unstable at this voltage. Although this kind of layered material has many advantages, they have inherent disadvantages, that is intrinsic poor rate capability and poor cycle stability and etc. It is mainly caused by surface restruction of the material resulting from activation of $Li_2MnO_3$ component when the material is charged to above 4.5V, as well as erosion of electrode material by electrolyte, structural changes in the cycling process and other factors.

SUMMARY OF THE INVENTION

The object of the present invention is to overcome the defects of existing lithium-ion cathode materials, such as poor rate capability and poor cycle stability and provide a lithium-rich manganese-based cathode material with excellent rate capability and cycle stability, its preparation method and lithium-ion battery.

After intensive study, the inventor of the present invention discovered that when the particle size of an electrode material is reduced to nanoscale, the diffusion path of lithium-ions can be effectively shortened, thereby facilitating lithium ions transfer in the electroactive materials to achieve high charge/discharge capacity in a short time; however, nanomaterial has a large specific surface area and poor thermodynamic stability. If a nanomaterial is used as an electrode material, the structural stability of the electrode material may be damaged and consequently resulting in poor rate capability and cycle stability, furthermore, the side reactions between electrode and electrolyte will be increased, resulting in poor safety and reduction of effective active materials. On this account, the inventors of the present invention prepare a lithium-rich manganese-based cathode material with a micron secondary particle by using $\alpha$-$MnO_2$ micron particles according to the method provided in the present invention. As parts of the micron secondary particles consist of primary nanoparticles, the lithium-rich manganese-based cathode materials obtained from the present invention take the advantages of nanomaterial with shortened lithium-ions diffusion path and good structural stability of a micron structure, thereby acquiring high rate capability and prolonged cycle stability. Thus the inventors accomplished the present invention.

Therefore, the present invention provides a method for preparing a lithium-rich manganese-based cathode material, wherein the method comprises: dispersing $\alpha$-$MnO_2$ micron particles, a nickel salt and a lithium-containing compound in a solvent to obtain a mixture, then evaporating the mixture to remove the solvent, and calcining the solid product obtained from the evaporation; wherein the lithium-containing compound is a lithium salt and/or lithium hydroxide.

The present invention also provides a lithium-rich manganese-based cathode material prepared by the above-mentioned method.

The present invention also provides a lithium-ion battery, wherein the lithium-ion battery contains the above lithium-rich manganese-based cathode material.

By using $\alpha$-$MnO_2$ micron particles, a lithium-rich manganese-based cathode material with a micron secondary particle structure is formed through the above method in the present invention, making the material have high rate capability and prolonged cycle stability and be able to obtain a high electrochemical capacity.

Other features and advantages of the present invention will be described in details in the subsequent embodiments.

BRIEF DESCRIPTION OF THE DRAWINGS

The drawings are intended to provide further understanding on the present invention and constitute a part of the Description. They are intended to explain the present invention in connection with the embodiment of the present invention and not to limit the present invention. Among the drawings.

DETAILED DESCRIPTION OF THE EMBODIMENTS

The embodiments of the present invention are elaborated below. It should be understood that these embodiments are intended to describe and explain the present invention and not to limit the present invention.

Figure 2:
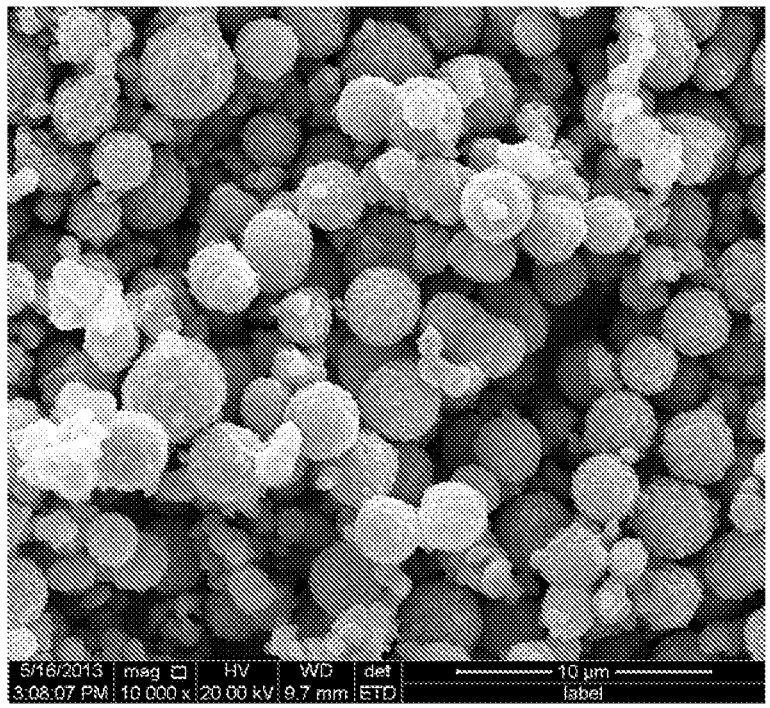
FIG. 2 is an SEM image of lithium-rich manganese-based cathode material L1 obtained from Example 1 of the present invention.
Figure 3:
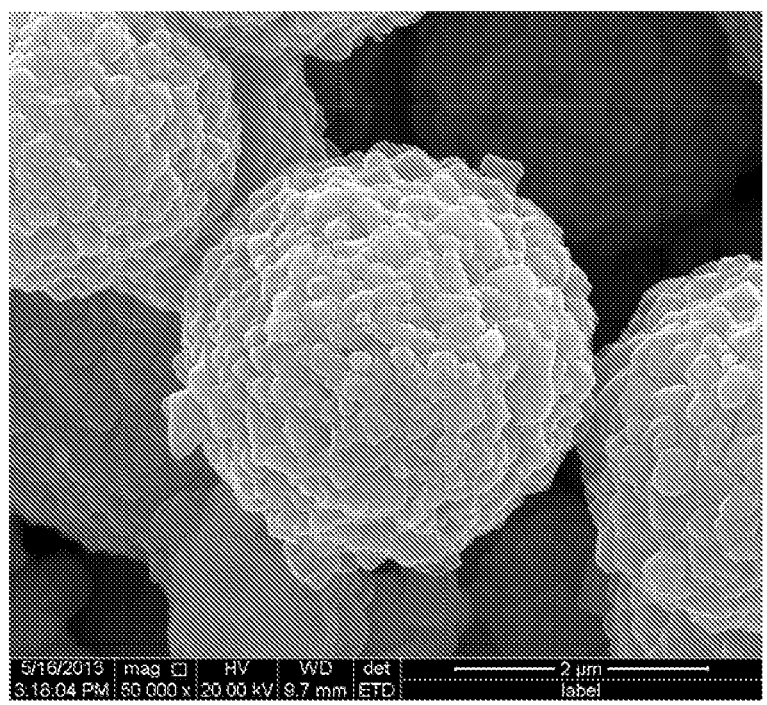
FIG. 3 is an enlarged SEM image of lithium-rich manganese-based cathode material L1 obtained from Example 1 of the present invention.

In the present invention, the primary nanoparticles refer to the nanoparticles which constitute micron secondary particles, for example the nanoscale particles in the partially enlarged view of micron secondary particles in FIG. 3 of the present invention. At least parts of the micron secondary particles consist of primary nanoparticles, for example the micron-scale particles shown in FIG. 2 and FIG. 3, and from the figures, we may see they are composed of many primary nanoparticles.

The present invention provides a method for preparing a lithium-rich manganese-based cathode material, wherein this method comprises: dispersing $\alpha$-$MnO_2$ micron particles, a nickel salt and a lithium-containing compound in a solvent to obtain a mixture, then evaporating the mixture to remove the solvent, and calcining the solid product obtained from the evaporation; wherein the lithium-containing compound is a lithium salt and/or lithium hydroxide.

According to the present invention, the $\alpha$-$MnO_2$ micron particles have the crystal form of $\alpha$-$MnO_2$. The inventor of the present invention discovered the co-effect of $\alpha$-$MnO_2$ and other active components containing metallic elements to form the lithium-rich manganese-based cathode material in the present invention. More importantly, these $\alpha$-$MnO_2$ micron particles are used as "precursor templates" during preparation of the lithium-rich manganese-based cathode material. Particularly, as for the $\alpha$-$MnO_2$ micron particles containing nanorods on their surface, the nanorods on the surface can provide enough specific surface area so that other added active components containing metallic elements can fully contact with such $\alpha$-$MnO_2$ micron particles and diffuse into these particles in the preparation process and further form the lithium-rich manganese-based cathode material through salts decomposition and gasification during the calcination process with pores and the micron secondary particle (at least part of which consists of the primary nanoparticles.

Therefore, the present invention does not have special limitation to the $\alpha$-$MnO_2$ micron particles as long as the provided $\alpha$-$MnO_2$ micron particles can take part in the preparation to obtain the lithium-rich manganese-based cathode material of the present invention. For example, they may be available from the market or obtained by a conventional method in the art. Preferably, the method for preparing the $\alpha$-$MnO_2$ micron particles comprises: mixing a water-soluble manganese salt, a persulfate salt, an acid and a water-soluble silver salt in water to take precipitation reaction and then separating, and heating and drying the separated solid.

Wherein, the water-soluble manganese salt may be one or more of manganese nitrate ($Mn(NO_3)_2$), manganese acetate ($MnAc_2$, i.e. $CH_3COO)_2Mn$), manganese sulfate ($MnSO_4$) and manganese chloride ($MnCl_2$), preferably is manganese nitrate and/or manganese sulfate. The persulfate salt may be one or more of ammonium persulfate (($NH_4)_2S_2O_8$), sodium persulfate ($Na_2S_2O_8$) and potassium persulfate ($K_2S_2O_8$), preferably is ammonium persulfate and/or sodium persulfate. The acid may be one or more of sulfuric acid ($H_2SO_4$), hydrochloric acid (HCl), nitric acid ($HNO_3$) and acetic acid (HAc, i.e. $CH_3COOH$), preferably is sulfuric acid and/or hydrochloric acid. The water-soluble silver salt may be one or more of silver nitrate ($AgNO_3$), sliver perchlorate ($AgClO_4$) and silver fluoride (AgF), preferably is silver nitrate and/or sliver perchlorate.

Wherein, in the preparation of the above $\alpha$-$MnO_2$ micron particles, the preferred way of mixing is as follows: firstly mixing water-soluble manganese salt and persulfate salt in water, then adding an acid solution and a silver salt solution successively to further blend them. The concentration of the silver salt solution is preferably 6-60 mmol $L^{-1}$. The concentration of the acid solution is preferably 8-19 mol $L^{-1}$, for example, the acid solution may be an 8-12 mol $L^{-1}$ HCl aqueous solution and also may be a 17-19 mol $L^{-1}$ $H_2SO_4$ aqueous solution (particularly preferred an 18.4 mol $L^{-1}$ $H_2SO_4$ aqueous solution).

Wherein, according to a preferred method for preparing of the above $\alpha$-$MnO_2$ micron particles in order to obtain better electromechanical performance, based on the molar amount of manganese element of the water-soluble manganese salt, molar amount of persulfate groups of the persulfate salt is preferably 90-120%, more preferably is 95-110%; molar amount of hydrogen element of the acid is preferably 300-3750%, more preferably is 400-2500%, still more preferably is 450-1500%; molar amount of silver element of the water-soluble silver salt is preferably 1-15%, more preferably is 1.2-8%.

More preferably, relative to 100 mL of water, the total molar amount of the water-soluble manganese salt, persulfate salt, acid and water-soluble silver salt is 15-200 mmol, preferably is 16-170 mmol.

Wherein, for example, relative to 100 mL of water, the amount of the water-soluble manganese salt may be 5-15 mmol, preferably is 7-10 mmol; the amount of the persulfate salt may be 5-15 mmol, preferably is 7.5-10 mmol; the amount of the acid may be 20-160 mmol, preferably is 35-150 mmol; the amount of the water-soluble silver salt may be 0.1-1 mmol, preferably is 0.12-0.7 mmol. When the acid is added in form of an acid solution (an aqueous solution of acid) and the silver salt is added in form of a silver salt solution (an aqueous solution of silver salt), the water volume refers to the combined volume of the added pure water and the volume of the silver salt solution and the acid solution.

Wherein, in the preparation of the above $a\alpha MnO_2$ micron particles, after the water-soluble manganese salt, persulfate salt, acid and water-soluble silver salt are mixed in water, $MnO_2$ precipitate would be generated through a precipitation reaction and can be obtained after separation. In order to obtain $MnO_2$ particles with better morphology and a higher yield, time of the precipitation reaction is preferably 10-50 h, more preferably is 12-48 h, still more preferably is 20-30 h.

The preferred condition of the precipitation reaction in the present invention is standing at room temperature.

Wherein, in the preparation of the above $\alpha$-$MnO_2$ micron particles, preferably the conditions of heating and drying the separated solid include: temperature is 50-100° C., time is 12-20 h. The above operation may be conducted in vacuum and the gauge pressure may be $-1 \times 10^5$ Pa or more, for example at $-0.8 \times 10^5$ Pa to $-1 \times 10^5$ Pa.

In the preparation of the above $\alpha$-$MnO_2$ micron particles, the $\alpha$-$MnO_2$ micron particles may be a smoothly spherical structure or spherical micron particles containing nanorods on their surface. In order to enable a sufficient contact between $\alpha$-$MnO_2$ micron particles and other components, preferably the $\alpha$-$MnO_2$ micron particles are spherical micron particles containing nanorods on their surface, for example diameter of the nanorods may be 5-40 nm and length of the nanorods may be 50-300 nm.

According to the present invention, there isn't special limitation to the nickel salt and lithium-containing compound as long as they can interact with the $\alpha$-$MnO_2$ micron particles to obtain the lithium-rich manganese-based cathode material in the present invention. In a preferred embodiment, the nickel salt is preferably one or more of nickel nitrate (Ni(NO$_3$)$_2$), nickel acetate (NiAc$_2$, i.e. (CH$_3$COO)$_2$Ni), nickel sulfate (NiSO$_4$), nickel carbonate (NiCO$_3$) and nickel chloride (NiCl$_2$), more preferably is nickel nitrate and/or nickel acetate, particularly preferably is nickel nitrate. In another preferred embodiment, the lithium salt is preferably one or more of lithium carbonate (Li$_2$CO$_3$), lithium nitrate (LiNO$_3$), lithium acetate (LiAc, CH$_3$COOLi), lithium sulfate (Li$_2$SO$_4$) and lithium chloride (LiCl), more preferably is lithium carbonate and/or lithium nitrate. The lithium-containing compound is more preferably one or more of lithium carbonate, lithium nitrate and lithium hydroxide (LiOH).

According to the present invention, although a lithium-rich manganese-based cathode material with high rate capability and prolonged cycle stability may be obtained from the α-MnO$_2$ micron particles, nickel salt and lithium-containing compound by the method for preparing a lithium-rich manganese-based cathode material provided in the present invention, but in a preferred embodiment, in order to further optimize the performance of the obtained lithium-rich manganese-based cathode material, based on the molar amount of α-MnO$_2$ micron particles, molar amount of nickel element of the nickel salt is preferably 1.5-100%, more preferably is 20-60%, still more preferably is 25-40%; the molar amount of lithium element of the lithium-containing compound is preferably 200-300%, more preferably is 200-250%, still more preferably is 230-250%.

According to the present invention, the method may also comprises introducing a cobalt salt during the dispersion, that is, dispersing α-MnO$_2$ micron particles, nickel salt, cobalt salt and lithium-containing compound in a solvent before subsequent treatment. There isn't a special limitation to the cobalt salt as long as it can make the cathode material in the present invention acquire better electrochemical performance. For example, the cobalt salt may be one or more of cobalt nitrate (Co(NO$_3$)$_2$), cobalt acetate (CoAc$_2$, i.e. (CH$_3$COO)$_2$Co), cobalt sulfate, (CoSO$_4$) cobalt carbonate (CoCO$_3$) and cobalt chloride (CoCl$_2$), preferably is cobalt nitrate and/or cobalt acetate.

Wherein, based on the molar amount of the α-MnO$_2$ micron particles, the molar amount of cobalt element of the cobalt salt is preferably 1.5-50%, more preferably is 20-35%.

In order to help form the cathode material as described in the present invention, with a secondary micron particle structure, at least parts of which consists of primary nanoparticles, relative to 1 mL of the solvent, total molar amount of the α-MnO$_2$ micron particles, nickel element of the nickel salt, lithium element of the lithium-containing compound and cobalt element of the optional cobalt salt is preferably 0.5-2 mmol, more preferably is 0.8-1.2 mmol.

According to the present invention, there isn't a special limitation to the solvent as long as it can sufficiently disperse the α-MnO$_2$ micron particles, nickel salt, lithium-containing compound and optional cobalt salt and meanwhile will not cause a severe side reactions in the above preparation process, for example, the solvent may be one or more of water, ethanol and methanol, preferably is water and/or ethanol.

According to the present invention, for example, the dispersion of the above raw materials can be realized by a manner of stirring, and the mixture can be evaporated under continued stirring to remove the solvent. Therefore, it may avoid the problem that a good secondary micron particle structure is difficult to be maintained due to excessive residue solvent in the calcination process. The conditions of the evaporation may be appropriately adjusted based on the type of the solvent and the amount of the product. For example, temperature of the evaporation may be 25-80° C., preferably is 25-60° C. and time of the evaporation may be 5-20 h, preferably is 8-12 h.

According to the present invention, the solid product obtained from the above evaporation will further complete inter-infiltration, diffusion, and solvent removal and substance oxygenolysis during the calcination process. Particularly, through oxygenolysis, the added metal-containing compounds will be oxidized and decomposed to generate gases and create pores in the obtained lithium-rich manganese-based cathode material and lead to the formation of primary nanoparticles which constitute the micron secondary particles. Thereby the lithium-rich manganese-based cathode material obtained from the present invention take the advantages of nanomaterial with shortened lithium-ions diffusion path and good structural stability of a micron structure, thereby acquiring high rate capability and prolonged cycle stability. There isn't a special limitation to the calcination conditions in the present invention as long as it can achieve the above effect. Preferably, it is a constant temperature calcination and conditions of the constant temperature calcination include: temperature is 750-1000° C., time is 8-15 h. Alternatively, it is a staged calcination, and conditions of the staged calcination include: heating at 350-600° C. for 2-5 h at first, then heating at 650-750° C. for 2-5 h and then heating at 760-1000° C. for 8-15 h. The present invention preferably adopts staged calcination. The present invention further prefers calcination in air atmosphere because it helps oxygenolysis of metal-containing compounds.

The present invention also provides a lithium-rich manganese-based cathode material prepared by the above method. The lithium-rich manganese-based cathode material provided by the present invention has a micron secondary particle structure, and at least parts of the micron secondary particle structure consists of primary nanoparticles, preferably at least the outer layer of the micron secondary particles consist of primary nanoparticles, and more preferably all parts of the micron secondary particles consists of primary nanoparticles.

According to the present invention, preferably the lithium-rich manganese-based cathode material is formulated by xLi$_2$MnO$_3$.(1−x)Li(Ni$_{1/3}$Co$_n$Mn$_{1/3}$)O$_2$, and 0<x≤1, n=0 or ⅓; more preferably 0.4≤x≤0.6, n=⅓. If cobalt salt is adopted during the preparation process, the above lithium-rich manganese-based cathode material contains cobalt element.

According to the present invention, the lithium-rich manganese-based cathode material is also in micron scale, and the size of the micron secondary particles is related to the size of the adopted α-MnO$_2$ micron particles, for example, particle size of the micron secondary particles is 1.2-12 wn, preferably is 1.5-5 wn. The present invention does not have special provisions on the particle size of primary nanoparticles, which partially constitute the micron secondary particles, but the particle size of the primary nanoparticles may be controlled according to the actual preparation conditions. In a preferred embodiment of the present invention, particle size of the primary nanoparticles is 50-500 nm, preferably is 150-450 nm.

The present invention also provides a lithium-ion battery, wherein the cathode materials of the lithium-ion battery comprised of the above lithium-rich manganese-based cathode material.

Furthermore, for a proper understanding of this document and in its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

The present invention is described in details in connection with examples as follows.

Preparation Example 1

Figure 1:
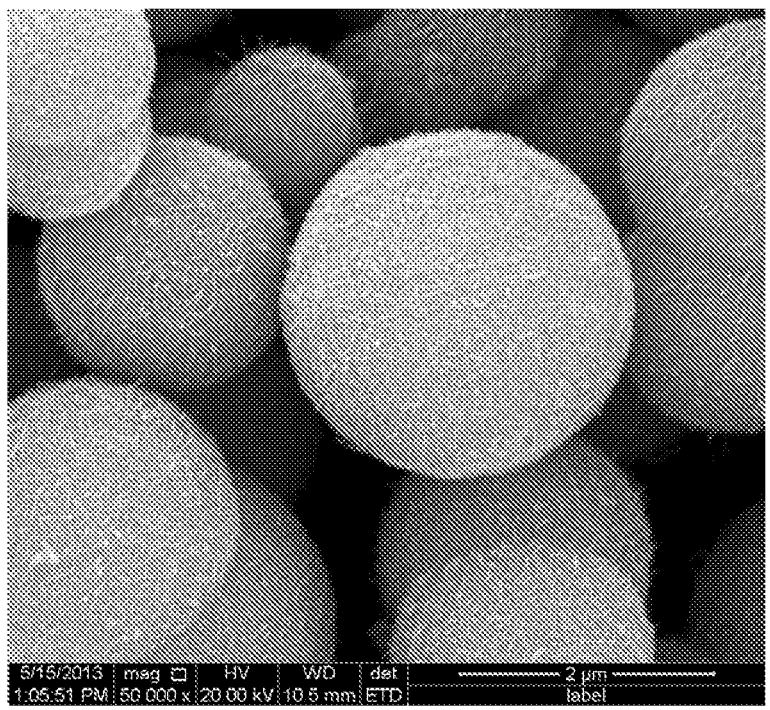
FIG. 1 is an SEM image of $\alpha$-$MnO_2$ micron particles A1 obtained from Preparation example 1.

16 mmol of $MnSO_4H_2O$ and 16 mmol of $(NH_4)_2S_2O_8$ are dissolved in 200 mL of distilled water at room temperature and then 2 mL of 18.4 mol·L$^{-1}$ $H_2SO_4$ aqueous solution and 8 mL of 60 mmol·L$^{-1}$ $AgNO_3$ aqueous solution are added to the above solution successively under stirring. After standing for 24 h, the mixture is centrifuged, the precipitate is washed 3 times by deionized water and ethanol respectively and the obtained solid is dried in a vacuum drying oven (the gauge pressure is $-1\times10^5$ Pa) at 80° C. for 12 h to obtain 16 mmol of $\alpha$-$MnO_2$ micron particles A1. From the SEM image, we may know the $\alpha$-$MnO_2$ micron particles A1 are spherically micron particles with a particle size of 1-4 μm and their surface has nanorods with a diameter of 10-15 nm and a length of 100-180 nm. The SEM image is shown in FIG. 1.

Preparation Example 2

20 mmol of $MnSO_4H_2O$ and 18 mmol of $(NH_4)_2S_2O_8$ are dissolved in 200 mL of distilled water at room temperature and then 8 mL of 18.4 mol·L$^{-1}$ $H_2SO_4$ aqueous solution and 4 mL of 60 mmol·L$^{-1}$ $AgNO_3$ aqueous solution are added to the above solution successively under stirring. After standing for 20 h, the mixture is centrifuged, the precipitate is washed 3 times by deionized water and ethanol respectively and the obtained solid is dried in a vacuum drying oven (the gauge pressure is $-1\times10^5$ Pa) at 90° C. for 10 h to obtain 20 mmol of $\alpha$-$MnO_2$ micron particles A2. From the SEM image, we may know the $\alpha$-$MnO_2$ micron particles A2 are spherically micron particles with a particle size of 2-4 μm and their surface has nanorods with a diameter of 5-20 nm and a length of 250-300 nm.

Preparation Example 3

15 mmol of $Mn(NO_3)_2$ and 17 mmol of $Na_2S_2O_8$ are dissolved in 200 mL of distilled water at room temperature and then 6 mL of 12 mol·L$^{-1}$ HCl aqueous solution and 20 mL of 60 mmol·L$^{-1}$ $AgClO_4$ aqueous solution are added to the above solution successively under stirring. After standing for 32 h, the mixture is centrifuged, the precipitate is washed 3 times by deionized water and ethanol respectively and the obtained solid is dried in a vacuum drying oven (the gauge pressure is $-0.8\times10^5$ Pa) at 75° C. for 15 h to obtain 15 mmol of $\alpha$-$MnO_2$ micron particles A3. From the SEM image, we may know the $\alpha$-$MnO_2$ micron particles A3 are spherically micron particles with a particle size of 1.7-4.2 μm and their surface has nanorods with a diameter of 15-30 nm and a length of 150-200 nm.

Example 1

This example is used to illustrate the lithium-rich manganese-based cathode material and its preparation method of the present invention.

Figure 4:
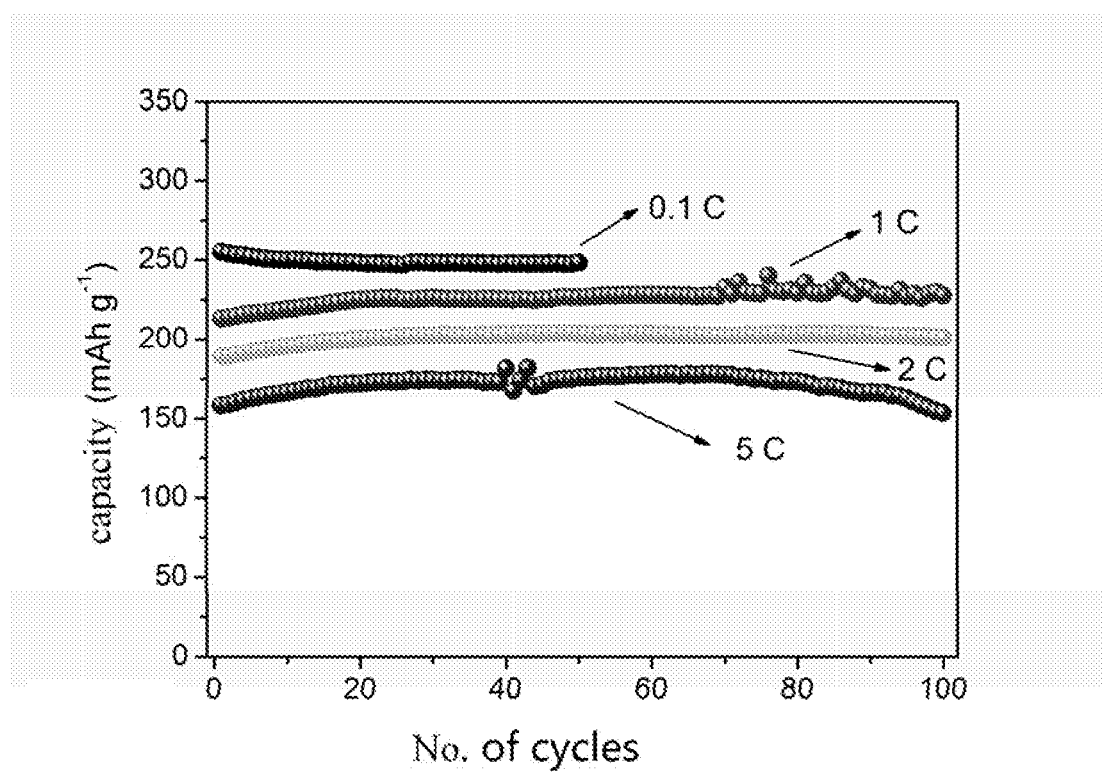
FIG. 4 is a plot of the electrochemical discharge cycling test of Example 1 of the present invention.

5.4 mmol of $\alpha$-$MnO_2$ micron particles A1, 1.3 mmol of $Ni(NO_3)_2 \cdot 6H_2O$, 1.3 mmol of $Co(NO_3)_2 \cdot 6H_2O$ and 6.3 mmol of $Li_2CO_3$ are mixed in 20 mL of ethanol. Ethanol is thoroughly evaporated from the obtained mixture at 60° C. under stirring (8 h). Then the solid product obtained is calcined in air atmosphere at 500° C. for 3 h, then at 750° C. for 3 h and finally at 900° C. for 12 h, consequently cooled to room temperature naturally to obtain $Li_{1.2}Ni_{0.13}Mn_{0.54}Co_{0.13}O_2$ lithium-rich manganese-based cathode material L1 in the present invention. From the SEM image, we may know the cathode material L1 has a micron secondary particle struture (the particle size is 2-4 μm) consisting of primary nanoparticles (the particle size is 120-260 nm). The SEM image is shown in FIG. 2 and FIG. 3;

Further, the cycle performance and rate capability of the cathode material L1 are tested through electrochemical charge/discharge. The results indicate that at 0.1 C, the initial discharge capacity is 255.2 mAhg$^{-1}$ and after 50 cycles, the capacity is retained at 248.4 mAhg$^{-1}$; at 1 C, the highest discharge capacity is 240 mAh·g$^{-1}$ and after 100 cycles, the capacity is retained at 226.2 mAh·g$^{-1}$; at 2 C, the highest discharge capacity is 204.2 mAh·g$^{-1}$ and after 100 cycles, the capacity is retained at 201.3 mAh·g$^{-1}$; at 5 C, the highest discharge capacity is 182 mAh·g$^{-1}$ and after 100 cycles, the capacity is retained at 153.9 mAh·g$^{-1}$. The test results are shown in FIG. 4.

Example 2

This example is used to illustrate the lithium-rich manganese-based cathode material and its preparation method of the present invention.

5 mmol of $\alpha$-$MnO_2$ micron particles A2, 1.7 mmol of $Ni(NO_3)_2 \cdot 6H_2O$, 1.7 mmol of $Co(NO_3)_2 \cdot 6H_2O$ and 6.14 mmol of $Li_2CO_3$ are mixed in 20 mL of ethanol. Ethanol is thoroughly evaporated from the obtained mixture at 40° C. under stirring (20 h). Then the solid product obtained is calcined in air atmosphere at 450° C. for 5 h, then at 700° C. for 5 h and finally at 950° C. for 10 h, consequently cooled to room temperature naturally to obtain $Li_{1.17}Ni_{0.17}Mn_{0.5}Co_{0.17}O_2$ lithium-rich manganese-based cathode material L2 in the present invention. From the SEM image, we may know the cathode material L2 has a micron secondary particle structure (the particle size is 2-3.5 μm) consisting of primary nanoparticles (the particle size is 100-200 nm);

Further, the cycle performance and rate capability of the cathode material L2 are tested through electrochemical charge/dicharge. The results indicate that at 0.1 C, the initial discharge capacity is 256.7 mAhg$^{-1}$ and after 50 cycles, the capacity is retained at 252.3 mAhg$^{-1}$; at 1 C, the highest discharge capacity is 233.3 mAhg$^{-1}$ and after 100 cycles, the capacity is retained at 215.6 mAhg$^{-1}$; at 2 C, the highest discharge capacity is 202.7 mAhg$^{-1}$ and after 100 cycles, the capacity is retained at 197.6 mAhg$^{-1}$; at 5 C, the highest discharge capacity is 173.8 mAhg$^{-1}$ and after 100 cycles, the capacity is retained at 150.9 mAhg$^{-1}$.

Example 3

This example is used to illustrate the lithium-rich manganese-based cathode material and its preparation method of the present invention.

5.6 mmol of $\alpha$-$MnO_2$ micron particles A3, 0.1 mmol of $NiAc_2$, 0.1 mmol of $CoAc_2$ and 12.92 mmol of lithium hydroxide are mixed in 20 mL of mixture of methanol and water (10 mL ethanol+10 mL water). The solvent is thoroughly evaporated from the obtained mixture at 50° C. under stirring (15 h). Then the solid product obtained is calcined in air atmosphere at 550° C. for 2.5 h, then at 650° C. for 4 h and finally at 850° C. for 14 h, consequently cooled to room temperature naturally to obtain $Li_{1.23}Ni_{0.1}Mn_{0.56}Co_{0.1}O_2$ lithium-rich manganese-based cathode material L3 in the present invention. From the SEM image, we may know the cathode material L3 has a micron secondary particle structure (the particle size is 2.1-3.4 μm) consisting of primary nanoparticles (the particle size is 350-500 nm);

Further, the cycle performance and rate capability of the cathode material L3 are tested through electrochemical charge/discharge. The results indicate that at 0.1 C, the initial discharge capacity is 251.4 $mAhg^{-1}$ and after 50 cycles, the capacity is retained at 248.5 $mAhg^{-1}$; at 1 C, the highest discharge capacity is 228.6 $mAhg^{-1}$ and after 100 cycles, the capacity is retained at 212.7 $mAhg^{-1}$; at 2 C, the highest discharge capacity is 199.6 $mAhg^{-1}$ and after 100 cycles, the capacity is retained at 189.5 $mAhg^{-1}$; at 5 C, the highest discharge capacity is 177.7 $mAhg^{-1}$ and after 100 cycles, the capacity is retained at 146.8 $mAhg^{-1}$.

Example 4

According to the method in Example 1 to conduct Example 4, differently, the way of calcination in Example 4 is directly calcined at 900° C. for 12 h to obtain $Li_{1.2}Ni_{0.13}Mn_{0.54}Co_{0.13}O_2$ lithium-rich manganese-based cathode material L5 in the present invention. From the SEM image, we may know the cathode material L5 has a micron secondary particle structure (the particle size is 3-5 μm) consisting of primary nanoparticles (the particle size is 190-420 nm);

Further, the cycle performance and rate capability of the cathode material L5 are tested through electrochemical charge/dicharge. The results indicate that at 0.1 C, the initial discharge capacity is 251.6 $mAhg^{-1}$ and after 50 cycles, the capacity is retained at 232.7 $mAhg^{-1}$; at 1 C, the highest discharge capacity is 215.2 $mAhg^{-1}$ and after 100 cycles, the capacity is retained at 190.4 $mAhg^{-1}$; at 2 C, the highest discharge capacity is 183.9 $mAhg^{-1}$ and after 100 cycles, the capacity is retained at 165.2 $mAhg^{-1}$; at 5 C, the highest discharge capacity is 176.4 $mAhg^{-1}$ and after 100 cycles, the capacity is retained at 142.4 $mAhg^{-1}$.

Above the preferred embodiments of the present invention are described in details, but the present invention is not limited to the details of the above embodiments. In the range of technical approach of the present invention, the technical scheme of the present invention may be modified in various simple ways. All these simple modifications should be within the scope of protection of the present invention.

In addition, it needs to be noted that the technical features described in the above embodiments may be realized in any appropriate way as long as the combination is reconcilable. In order to avoid unnecessary repetition, the present invention does not explain the possible ways of combination.

Further, the embodiments of the present invention may be freely combined as long as the combination does go against the thought of the present invention. Likewise, they also should be deemed as content disclosed by the present invention.

The invention claimed is:

1. A method for preparing a lithium-rich manganese-based cathode material comprising:
   dispersing $\alpha\text{-}MnO_2$ micron particles, a nickel salt and a lithium-containing compound in a solvent to obtain a mixture, then evaporating the mixture to remove the solvent, and calcining the solid product obtained from the evaporation;
   wherein the calcination is a staged calcination comprising the following conditions: heating at 350-600° C. for 2-5 h at first, then heating at 650-750° C. for 2-5 h and then heating at 760-1000° C. for 8-15 h;
   wherein the lithium-containing compound is one or both of a lithium salt or lithium hydroxide;
   wherein, particle size of the $\alpha\text{-}MnO_2$ micron particles is 1-10 μm, and the $\alpha\text{-}MnO_2$ micron particles are spherical micron particles containing nanorods on their surface, diameter of the nanorods is 5-40 nm and length of the nanorods is 50-300 nm.

2. The method according to claim 1, wherein based on the molar amount of $\alpha\text{-}MnO_2$ particles, the molar amount of the nickel element of the nickel salt is 1.5-100% and the molar amount of the lithium element of the lithium-containing compound is 200-300%.

3. The method according to claim 2, wherein based on the molar amount of $\alpha\text{-}MnO_2$ micron particles, molar amount of nickel element of the nickel salt is 20-60%;
   molar amount of lithium element of the lithium-containing compound is 200-250%.

4. The method according to claim 1, wherein the nickel salt is one or more of nickel nitrate, nickel acetate, nickel sulfate, nickel carbonate and nickel chloride;
   the lithium salt is one or more of lithium carbonate, lithium nitrate, lithium acetate, lithium sulfate and lithium chloride.

5. The method according to claim 1, wherein the method also comprises introducing a cobalt salt during the dispersion, and based on the molar amount of $\alpha\text{-}MnO_2$ micron particles, molar amount of cobalt element is 1.5-50%.

6. The method according to claim 5, wherein relative to 1 mL of the solvent, total molar amounts of the $\alpha\text{-}MnO_2$ micron particles, nickel element of the nickel salt, lithium element of the lithium-containing compound and cobalt element of the cobalt salt is 0.5-2 mmol.

7. The method according to claim 6, wherein relative to 1 mL of the solvent, total molar amounts of the $\alpha\text{-}MnO_2$ micron particles, nickel element of the nickel salt, lithium element of the lithium-containing compound and cobalt element of the optional cobalt salt is 0.8-1.2 mmol.

8. The method according to claim 5, wherein the cobalt salt is one or more of cobalt nitrate, cobalt acetate, cobalt sulfate, cobalt carbonate and cobalt chloride.

9. The method according to claim 5, wherein the method also comprises introducing a cobalt salt during the dispersion and based on the molar amount of $\alpha\text{-}MnO_2$ micron particles, molar amount of cobalt element is 20-35%.

10. The method according to claim 1, wherein temperature of the evaporation is 25-80° C.

11. The method according to claim 1, wherein particle size of the $\alpha\text{-}MnO_2$ micron particles is 2-5 μm.

12. The method according to claim 1, wherein a method for preparing the $\alpha\text{-}MnO_2$ micron particles comprises:
    mixing a water-soluble manganese salt, a persulfate salt, an acid and a water-soluble silver salt in water to take precipitation reaction and then separating, and heating and drying the separated solid;
    optionally, the water-soluble manganese salt is one or more of manganese nitrate, manganese acetate, manganese sulfate and manganese chloride;
    optionally, the persulfate salt is one or more of ammonium persulfate, sodium persulfate and potassium persulfate;

optionally, the acid is one or more of sulfuric acid, hydrochloric acid, nitric acid and acetic acid;

optionally, the water-soluble silver salt is one or more of silver nitrate, silver perchlorate and silver fluoride optionally, time of the precipitation reaction is 10-50 hr.

13. The method according to claim 12, wherein the way of mixing is as follows:

firstly mixing water-soluble manganese salt and persulfate salt in water, then adding an acid solution and a silver salt solution successively to further blend them optionally, time of the precipitation reaction is 12-48 h;

optionally, conditions of the heating and drying include: temperature is 50-100° C., time is 12-20 h.

* * * * *